US012117102B2

(12) United States Patent
Fernandes

(10) Patent No.: US 12,117,102 B2
(45) Date of Patent: *Oct. 15, 2024

(54) METHOD FOR MANUFACTURE, ASSEMBLY AND CONTINUOUS CONSTRUCTION OF PIPE SECTIONS IN A SPOOLBASE WITH GRADUAL MOVEMENT

(71) Applicant: Paulo Roberto Gomes Fernandes, Rio de Janeiro (BR)

(72) Inventor: Paulo Roberto Gomes Fernandes, Rio de Janeiro (BR)

(*) Notice: Subject to any disclaimer, the term of this patent is extended or adjusted under 35 U.S.C. 154(b) by 0 days.

This patent is subject to a terminal disclaimer.

(21) Appl. No.: 18/473,646

(22) Filed: Sep. 25, 2023

(65) Prior Publication Data

US 2024/0084923 A1    Mar. 14, 2024

Related U.S. Application Data

(63) Continuation of application No. 17/441,682, filed as application No. PCT/BR2020/000009 on Mar. 20, 2020, now Pat. No. 11,781,675.

(30) Foreign Application Priority Data

Mar. 22, 2019    (BR) .......................... 102019005702-5

(51) Int. Cl.
*F16L 1/036* (2006.01)
*B21C 37/06* (2006.01)
(Continued)

(52) U.S. Cl.
CPC .............. *F16L 1/038* (2013.01); *B21C 37/06* (2013.01); *F16L 1/036* (2013.01); *F16L 1/16* (2013.01); *F16L 1/161* (2013.01)

(58) Field of Classification Search
CPC . F16L 1/036; F16L 1/161; F16L 1/205; F16L 1/206; F16L 1/207
See application file for complete search history.

(56) References Cited

U.S. PATENT DOCUMENTS 3,713,275 A    1/1973   Hyatt
3,984,007 A    10/1976  Birdwell
(Continued)

FOREIGN PATENT DOCUMENTS

CL    2010000698 A1    12/2010
WO    2009109021 A1    9/2009
(Continued)

OTHER PUBLICATIONS

Written Opinion for PCT/BR2020/000009 dated Oct. 15, 2020.
International Search Report for PCT/BR2020/000009 dated Oct. 15, 2020.

*Primary Examiner* — Frederick L Lagman
(74) *Attorney, Agent, or Firm* — PEARNE & GORDON LLP

(57) ABSTRACT

A process for the manufacture, assembly and continuous construction of tubular sections made of steel or polymer in individual pipelines with gradual movement that is designed to mechanize and automate a process substantially eliminating or mitigating existing inefficiencies and risks, considerably reducing the time vessels need to be moored at piers while paying extremely expensive daily rates, increasing the quality of welds, inspections and the entire process. The process including inside the manufactured unit one or more weld cabins and a series of support devices with synchronized driven and free wheels that carry the pipe segments while simultaneously enabling movement of the entire stalk without external interference, following the joining of several pipe segments (welded together), of variable length, in (Continued)

which the embodiments provided in the present invention enable each stalk to be approximately 1.2 km long or longer.

33 Claims, 14 Drawing Sheets

(51) Int. Cl.
*F16L 1/038* (2006.01)
*F16L 1/16* (2006.01)

(56) References Cited

U.S. PATENT DOCUMENTS

| | | |
|---|---|---|
| 4,002,248 A | 1/1977 | Moller |
| 4,029,215 A | 6/1977 | Birdwell |
| 4,073,156 A | 2/1978 | Smith |
| 5,044,825 A | 9/1991 | Kaldenbach |
| 6,089,489 A | 7/2000 | Cruickshank |
| 6,540,440 B1 | 4/2003 | Beaujean |
| 7,029,206 B2 * | 4/2006 | Stockstill ............... F16L 1/23 405/168.4 |
| 7,927,040 B2 | 4/2011 | Wilson |
| 8,328,467 B2 | 12/2012 | Thompson |
| 11,781,675 B2 * | 10/2023 | Fernandes ............... F16L 1/036 405/154.1 |
| 2007/0258772 A1 | 11/2007 | Bursaux |
| 2014/0369764 A1 | 12/2014 | Hoffmann |
| 2016/0084407 A1 | 3/2016 | Cowie |

FOREIGN PATENT DOCUMENTS

| | | |
|---|---|---|
| WO | 2010017398 A1 | 2/2010 |
| WO | 2013102754 A1 | 7/2013 |
| WO | 2016094992 A1 | 6/2016 |
| WO | WO 2022/090697 * | 5/2022 |

* cited by examiner

METHOD FOR MANUFACTURE, ASSEMBLY AND CONTINUOUS CONSTRUCTION OF PIPE SECTIONS IN A SPOOLBASE WITH GRADUAL MOVEMENT

CROSS REFERENCE TO RELATED APPLICATIONS

This is a continuation of U.S. patent application Ser. No. 17/441,682 filed Sep. 21, 2021, issued as U.S. Pat. No. 11,781,675 on Oct. 10, 2023, which is the US national stage filing of PCT International Application No. PCT/BR2020/000009, filed Mar. 20, 2020, which claims priority from BR 102019005702-5, filed Mar. 22, 2019. These applications are incorporated herein in their entirety by reference.

SUMMARY OF THE INVENTION

The present invention consists of a process for the manufacture, assembly and continuous construction of pipe sections of steel or polymers in single pipelines in order to be used in constructing strings in the shape of hydrocarbon, water, chemicals, services, utilities, instrumentation, electrical pipes and control production and transportation conduits for application in submarine (offshore) and land (onshore) water in the application of conduit pipes for land conduits, whether buried, in land strips above ground level (apparent conduits), in open troughs, tunnels, micro tunnels, conduit paths and pipe racks, specifically for the continuous feeding for a spoolbase or naval base/pier for ships of spool type ("S" Kay, "J" Lay and Barges with "DP", with the help of stinger or not), the term "Spoolbase" comprises an onshore facility used for easy placing; welding and continuous assembling for producing conduits for conducting oil and gas offshore.

PRIOR ART

The process of present invention was designed to resolve the critical issues of the prior art. As confirmed, the present configuration for producing strings of pipes (stalks) in a Spoolbase evidences situations with restriction of access, difficulty in mobilizing machines and equipment, adverse conditions for operation of equipment, necessity and dependence of professionals extremely skilled, having individual special capacities; as well as experience to resolve difficulties in positions of welding and difficult inspections, and overcoming such difficulties does not assure that damages are avoided to coating of pipes, stress and fatigue per number of cycles in grade of steel with unnecessary strain arising from movement exaggerated strains caused by unsuitable machines, poor handling, as well as risks of accidents with human losses.

Further the process for manufacture, assembly and construction of present invention reduces dramatically the time involved in conducting the assembly of pipelines in one or any traditional Spoolbase, eliminating the necessity of direct handling of pipes during definite positioning of conduit lines, also reducing the need for large areas of construction sites, as well as the exposure of the mounting team to unhealthy and/or dangerous conditions. It solves definitely the risks and the interruptions of operations due to negative interference and climate effects and automates as a whole all the operation without human contact.

In the procedure of prior art, all operations are roughly carried out starting with the axial displacement within the first welding cabin which is done by manual hoists of ratchet type, commonly known as Tyfor®. Said movement is highly imprecise and requires risks of accidents and damages to the coating and "ovalization" of pipes.

The procedure of prior art briefly comprises the construction of several pipe strings of about 1 km long in a pipe shop upon welding of several sections of pipes that may vary from 6, 12 or 18 meters, said strings being later displaced by spot pulling, or more specifically tugged outward of pipe shop by improvised equipment without accuracy and, after a determined positioning, displaced by unsuitable machines (mechanical excavators) to a stock stack of "lung". Said string is stored in said stack of "lung" until upon arrival of a ship form transporting the pipe string generally of about 5 km long, said strings are displaced one by one to a roller line, the first string being displaced to the roller lines is again displaced by pulling to the given position with one of its ends being fixed appropriately to the spool type ship, and the other end of said first string being welded to an end of a second string, also stored in the "lung" stock and that is displaced laterally to the same roller lines that received the first string. All said process occurs continuously until the pipelines are complete.

The construction of pipeline strings also complies with usual procedures. After constructing a first section, still inside the welding cabin, a steel cable device is fixed to one of the ends of the first pipe of pipe segments (downstream) of the pipe segment. This imprecise device and of high risk of breakage if attached to a bachoe, tractor or any other traction equipment, to pull the pipe segment under formation, as other pipes are added (by welding) to form the string (Stalk). Said pulling is considered imprecise and of high risk as each pipe is added (by welding) to the string (Stalk) and its weight increases with tube added by welding.

One drawback in such procedure of pulling is that the pulling force vector due to physical as spatial limitations is not aligned with the axial horizontal axis of the pipe string disposed in a rollers line. Such constructive and execution arrangement may cause, and frequently causes, several incidents among which misalignment or bending of the pipeline on the rollers, the skipping itself of the string over the rollers with serious consequences and collateral damages from the misalignment caused by the pulling presently employed in aligning the pipes for welding inside the first welding cabin.

The string of about 1 km (depending on the available space in the work site and/or vessel) is, therefore, pulled to the end of the first roller line to be moved laterally to a storage stack disposed laterally in relation to said first roller line.

A critical point of present invention, the displacement of the string (Stalk) to the storage stack currently is made in a rough matter, upon using backhoes adapted to lift and translate the strings one by one in sections of 50 meters of column of about 1 km, as shown schematically in FIG. 8. Such movement of string depends on the several factors, namely: favorable climate conditions, conditions of the ground where the machines operate and circulate, remarked dependence on several operators skilled for operating the backhoes, coordination and synchronism of several operators to displace the string without causing damages to the same.

Such factors effectively cause cost increase, delay and make it complex the operation of displacing the strings, in addition to representing high risk to the execution and final quality of the resulting product, as well as risk to life of people involved in the process.

The same type of operation of displacement for the storage stack is executed when displacing the strings of the storage stack to the roller line that will lead to the columns to the second welding step doubling the risks arising from the rough displacement mentioned above.

It is worth noting that each of the steps of displacing one string as currently made takes about 5 to 6 hours in such movement.

Here it is worth noting that the strings are removed from the storage stack to the roller line to be welded one another, said welding commonly occurring in three steps: root welding pass, filling welding pass, and finishing welding pass; the three welds occurring in that step consume about eight hours.

The estimated time to manufacture each section of pipeline (string) of 1.3 km is of about 660 hours, and to manufacture a definite line of about 5 km more 12 hours are added for displacing of roller line-storage stack-roller line and 24 h of welding, amounting almost 700 hours at high risk and cost.

The estimated time above does not take into consideration possible unfavorable climate conditions, lack of skilled personnel, and loading time of the ship, since the winding of spool has to be made slowly and the strings of 1.3 km are only welded on another after winding each section, not being an absurd to estimate around 750 hours all the manufacturing processing of the strings until the effective loading/embarking of the ship.

The manufacturing, assembling, and constructing process of present invention optimizes and reduces all operational risks, quality failure of final product, execution terms; and it reduces the construction costs and inherent risks to the assembling process, clearly overcoming the issued found in prior art from the manual and artisanal method of conduct lines in Spoolbase currently found.

SUMMARY OF THE INVENTION

Figure 1:
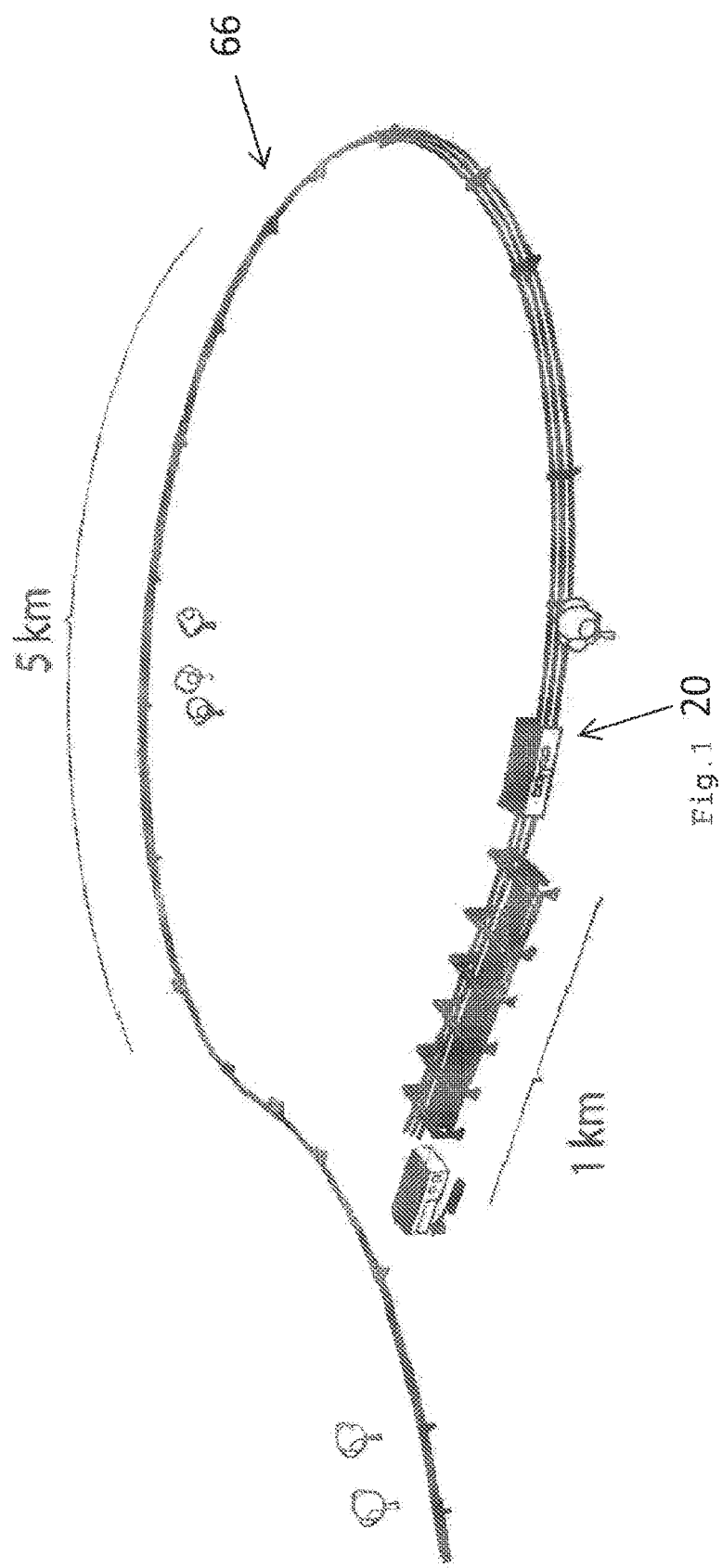
FIG. 1 depicts a second embodiment of present invention showing two production lines, a first line (1) producing strings (10), and a second production line (20) joining strings (10) one another, a word site (25) having lung stock (30) and ports (15), as well as storage site of finished conduct lines (66)
Figure 2:
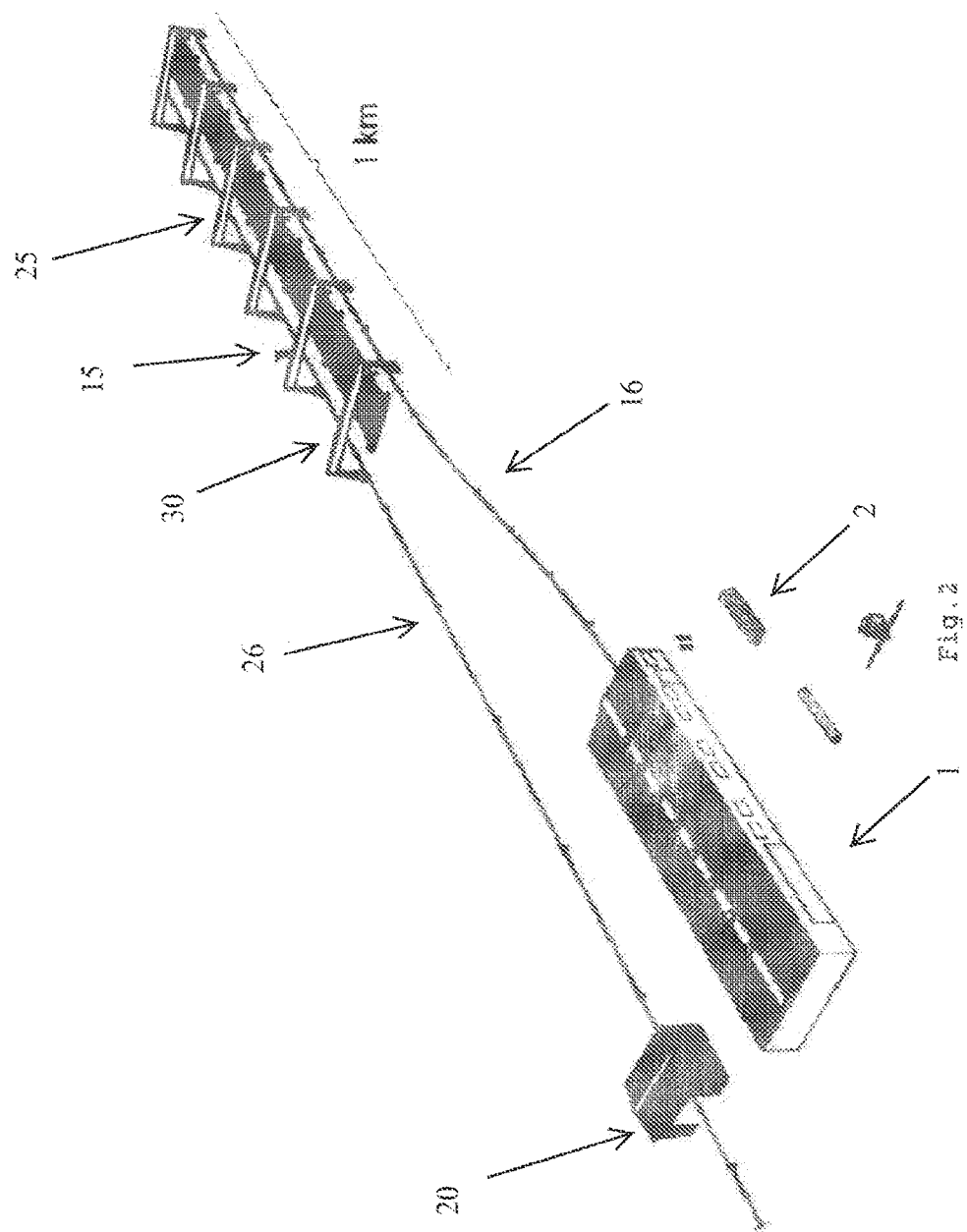
FIG. 2 depicts a first embodiment of present invention showing two production lines, a first line (1) producing strings (10), and a second production line (20) joining strings (10) one another, a word site having lung stock (30) and ports (15), further showing a first roller line (16) and a second driving roller line (26), as well as pipe stock (2) for feeding the first production line (1)
Figure 3:
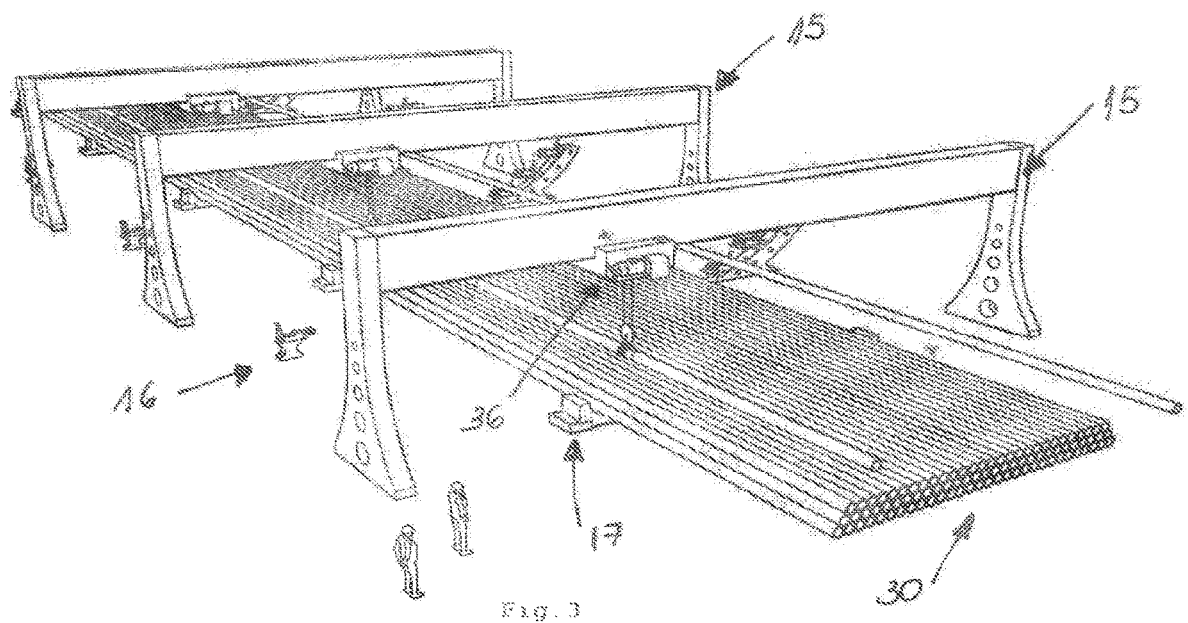
FIG. 3 comprises a schematic and perspective view of "lung" stock (30) and ports (15) according to arrangement foreseen for the second embodiment of present invention, further showing the rolling bridges (36) and supporting elements of strings (17) of central work site (25), as well as driving rollers automated and synchronized (6) of first roller line (16) and set of driving rollers and piperack (46) of second driving roller line (26).
Figure 4:
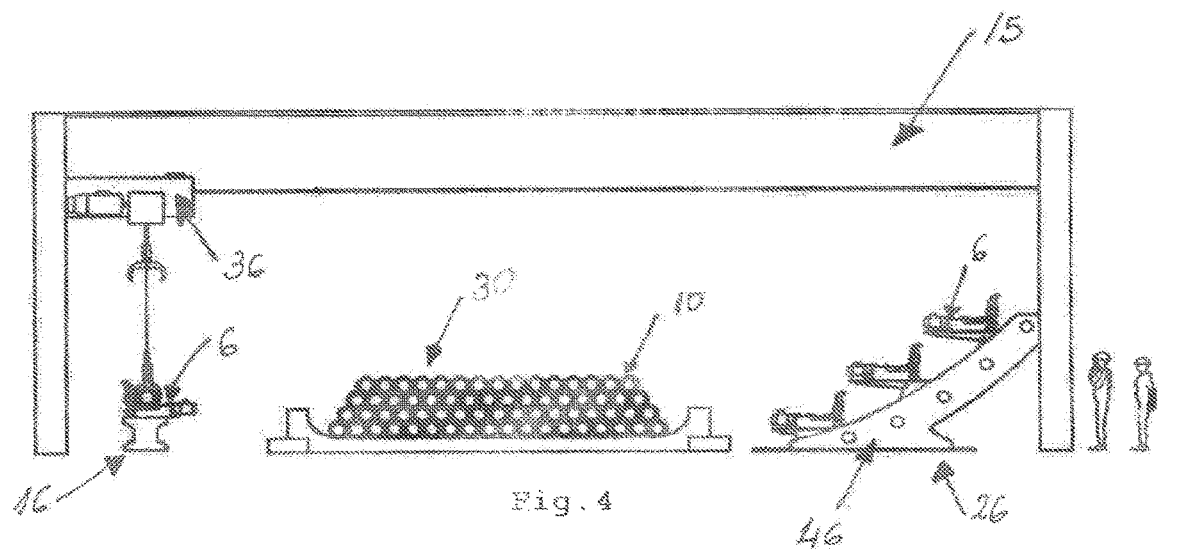
FIGS. 4, 5, 6, and 7 illustrate the process of present invention applied to the first embodiment with displacement of string (10) from first roller line (16) according to FIG. 4, and further disposal of the same in "lung" stock (30), according to FIG. 5. Afterwards, the rolling bridge (36) lifts one string (10) as shown in FIGS. 6, said string being disposed in second roller line (26) in one piperack (46) as foreseen in second embodiment of present invention.
Figure 5:
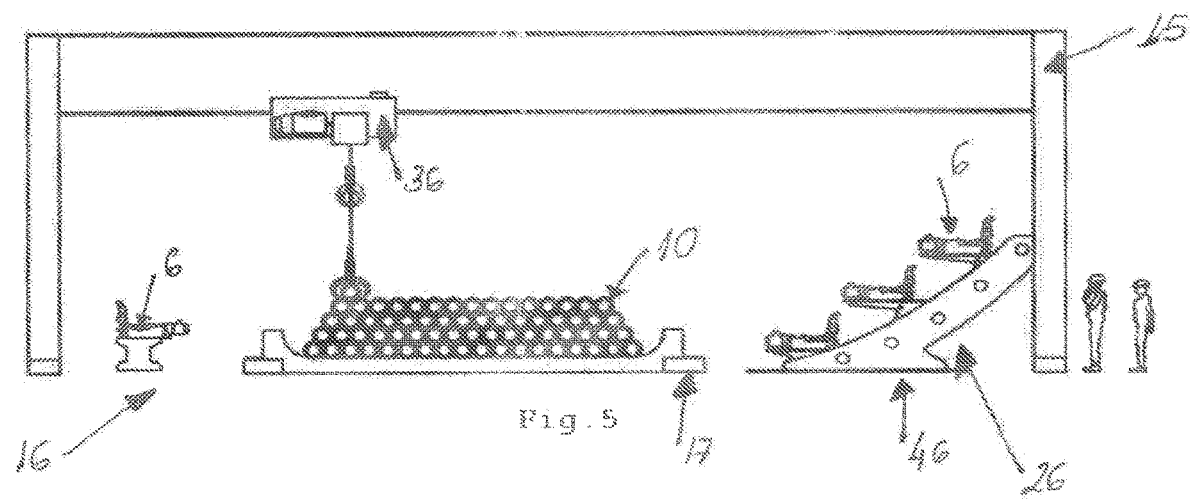
Figure 6:
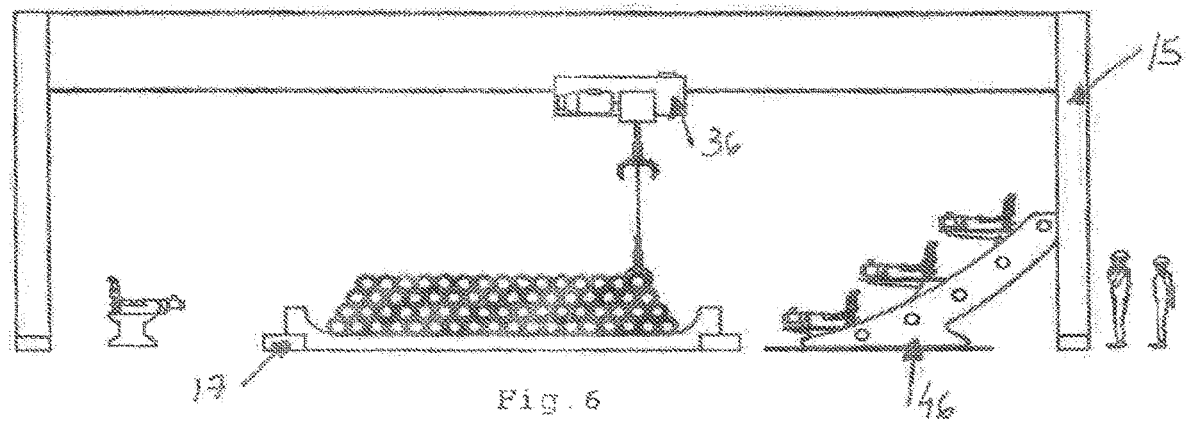
Figure 7:
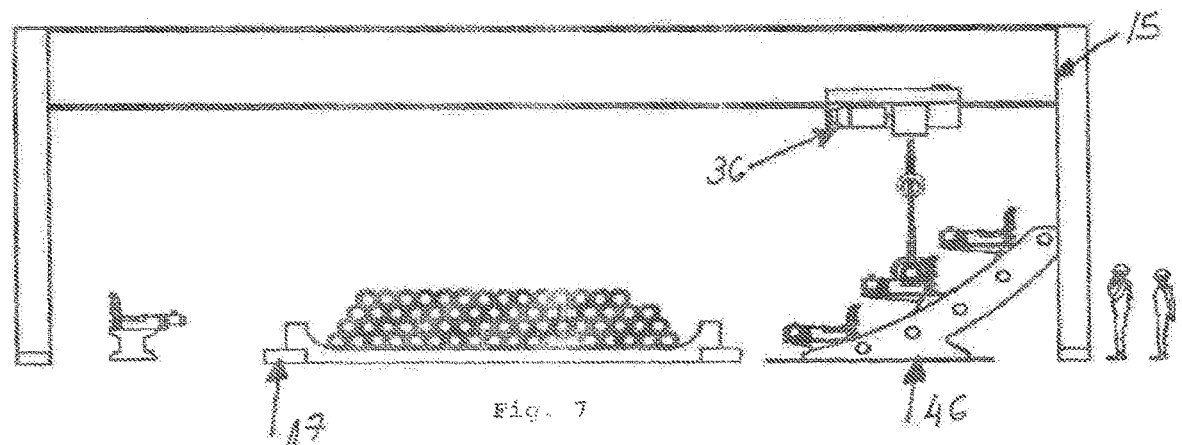
Figure 8:
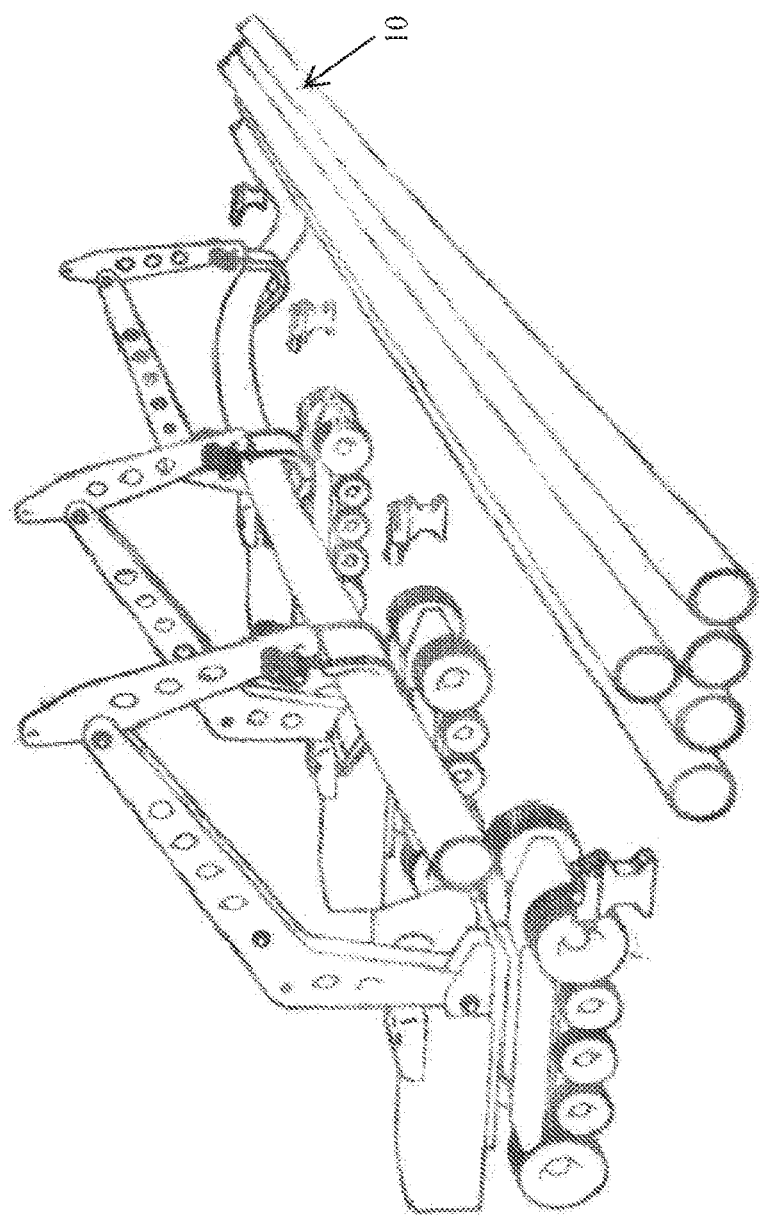
FIG. 8 illustrates the way of displacing column as currently performed.
Figure 9:
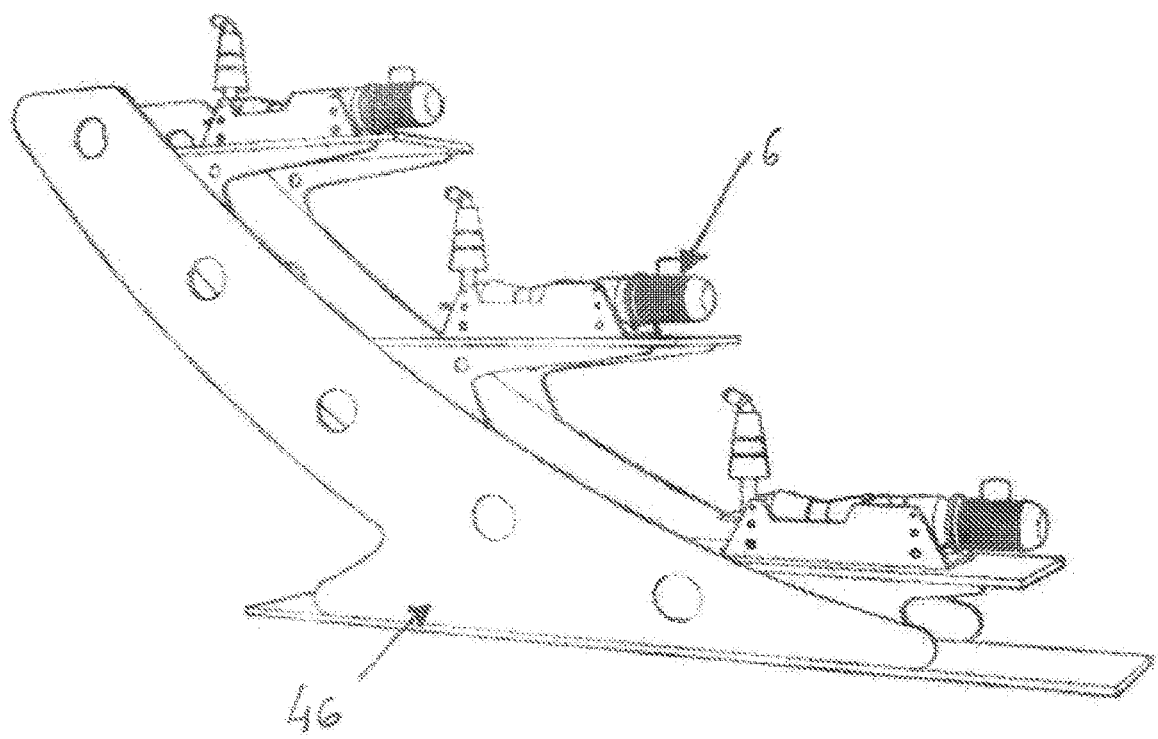
FIG. 9 illustrates the piperack (46) having three driving rollers (6) installed, only as an example, since said piperack, if required, can comprise more than three levels having more than three rollers.
Figure 10:
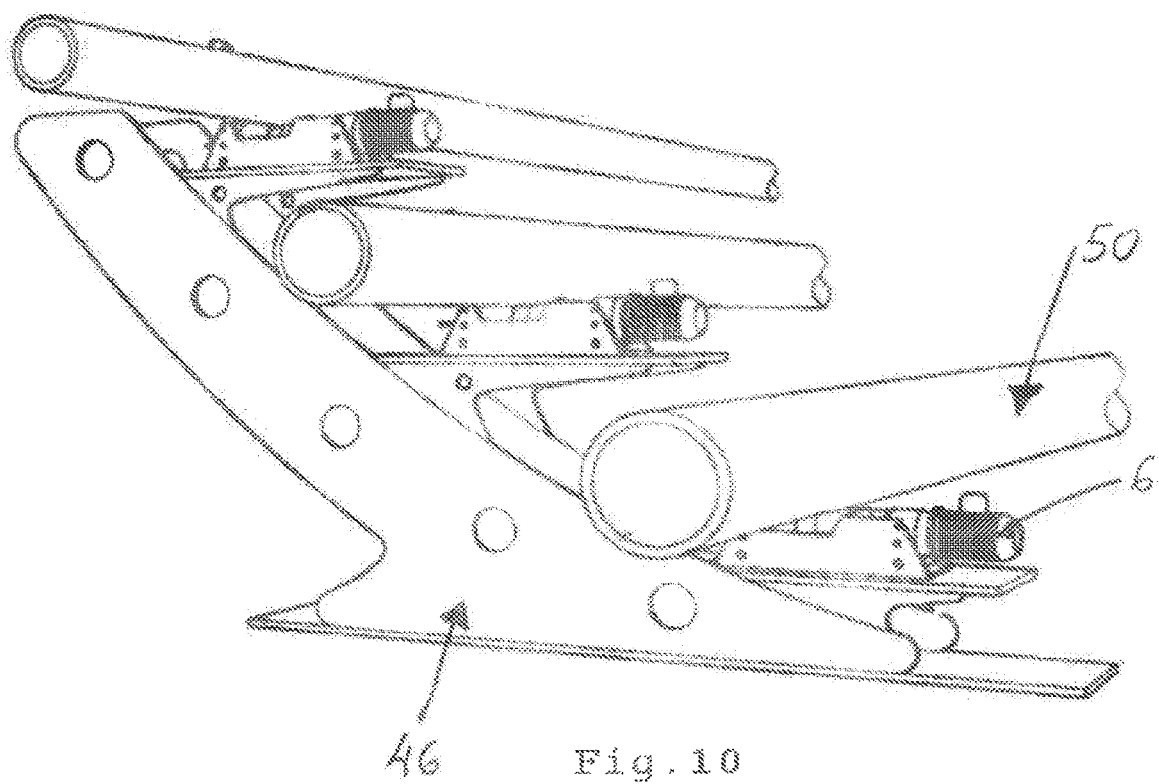
FIG. 10 illustrates a piperack (46) having three driving rollers (6) installed and strings (10) disposed on the driving rollers (6).
Figure 11:
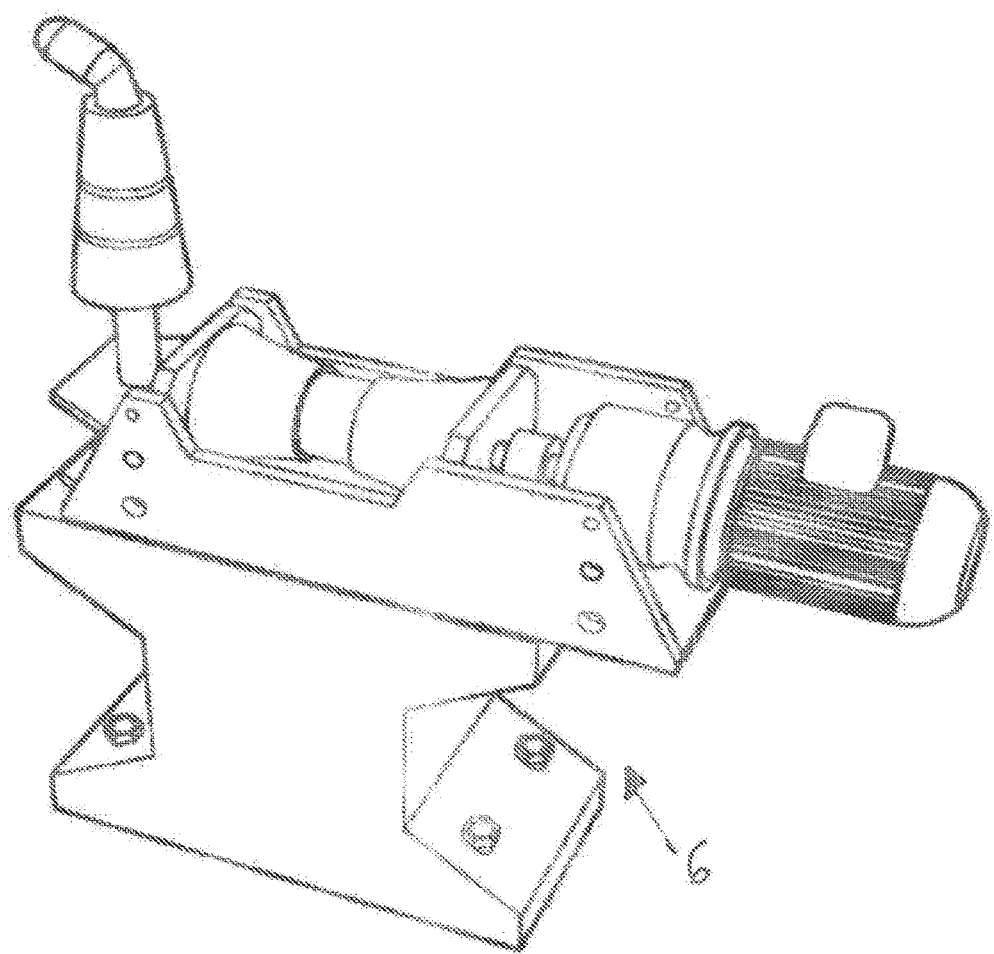
FIG. 11 illustrates a driving roller (6) employed in present invention.
Figure 12:
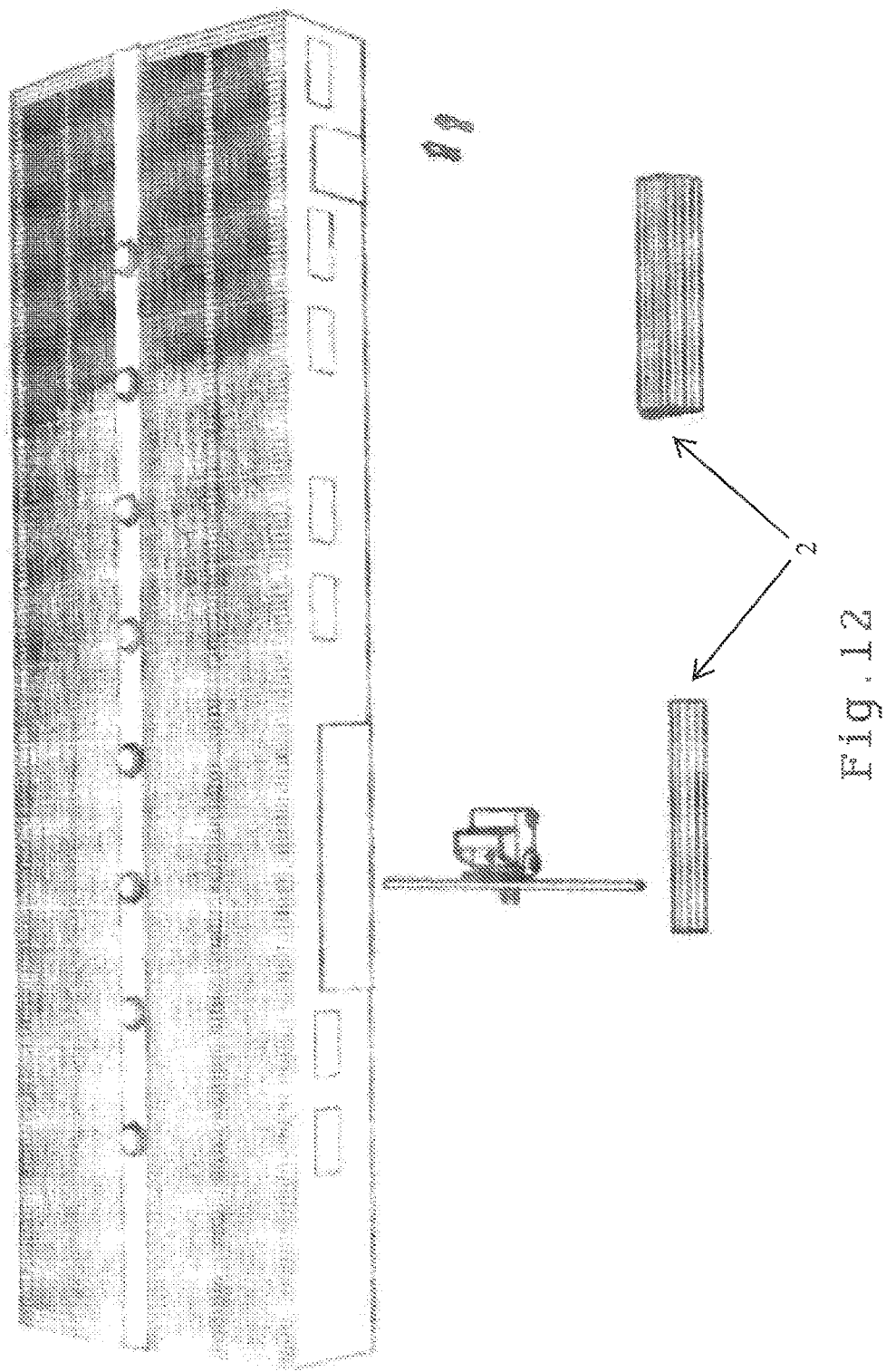
FIG. 12 comprises a top view of first production line (1), and the corresponding pipe "lung" stock (2) thereof.
Figure 13:
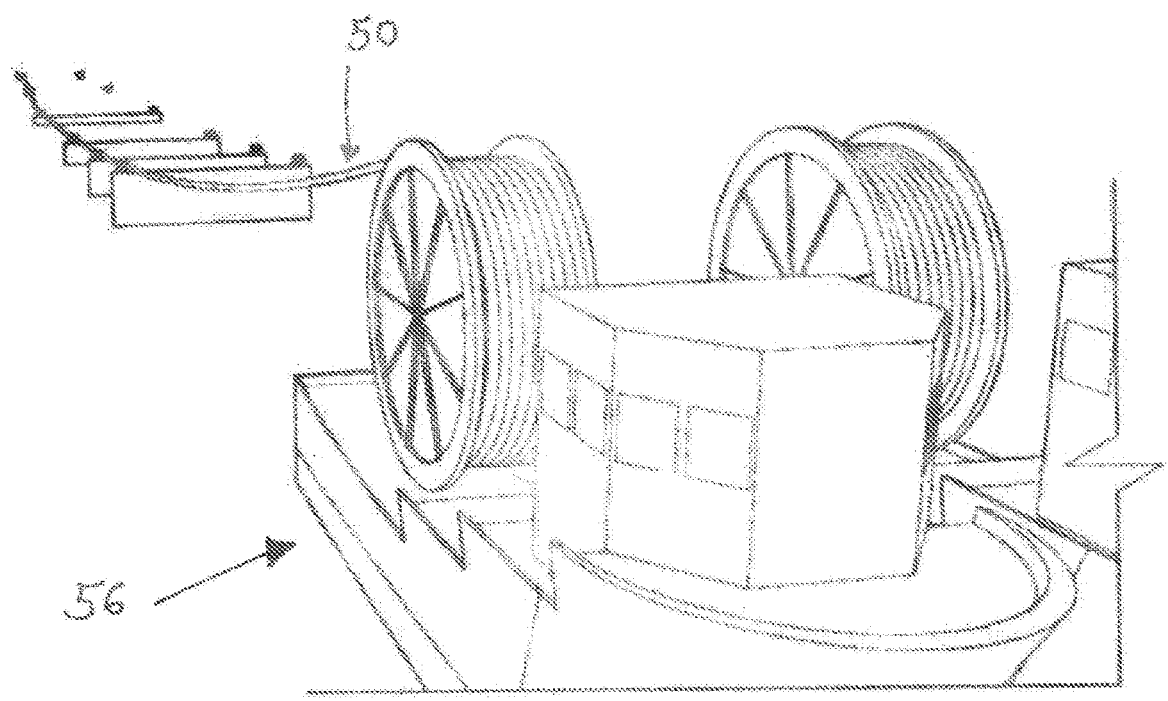
FIG. 13 illustrates a spool-type vessel (56) being loaded in a line (50).
Figure 14:
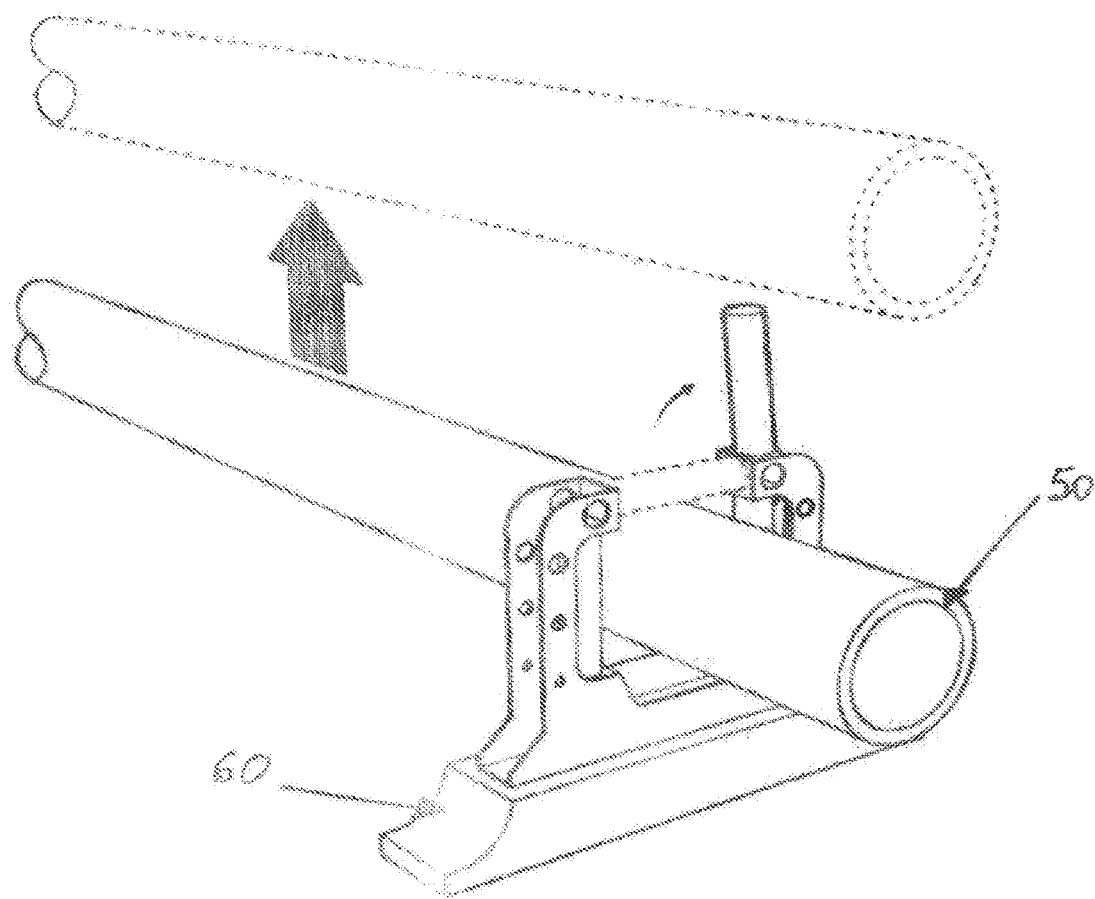
FIG. 14 illustrates a string (10) of present invention in a supporting roller (60) disposed the final portion of driving rollers line (26) of second production line (20) which specific purpose is not allow string (10) to bias upwards, or laterally, keeping the direction of second production line (20).
Figure 15:
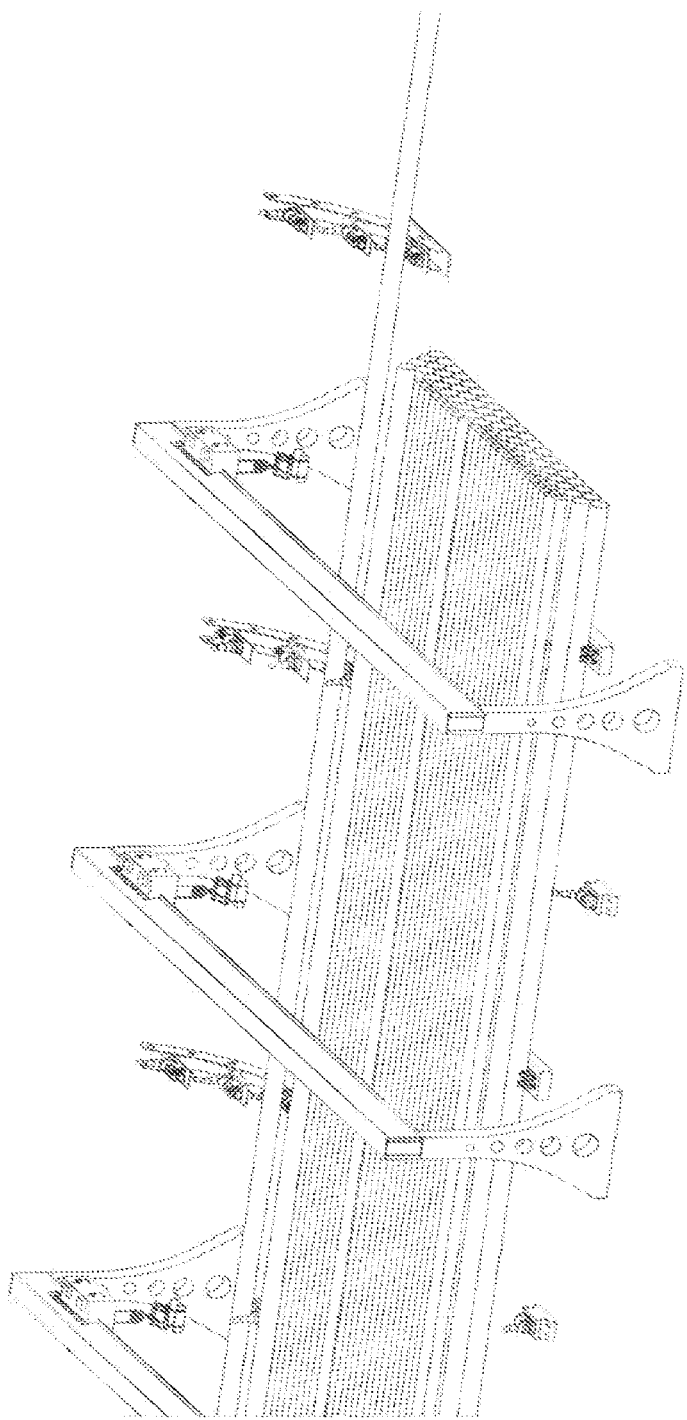
FIGS. 15 and 16 illustrate the manufacturing of strings (stalk) and conduit lines of several diameters, at the same time and in simultaneous displacement phases.
Figure 16:
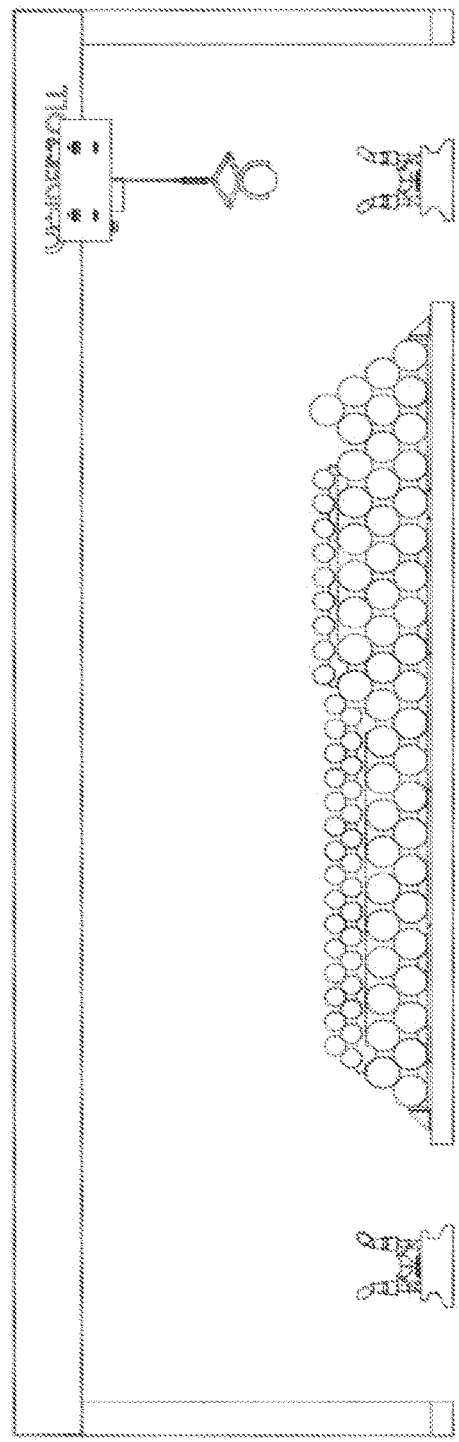

The traditional method of assembling pipes for conducting fluids (oil pipelines, gas pipelines, pipes for other derivatives, water pipeline, etc.), as well as electrical conduit and pipes for auxiliary services with the constructive aim of manufacture, formation, and transportation from pipes joined in pipe sections—of convenient length for the intended use—of strings (stalks) to the work site where they are arranged in stock stacks, in an arrangement approximately parallel to the manufacturing installation (shed) and arranged aligned in a welding line ("fire line") one by one for welding or in pre-united sets by means of previous and anticipated welding (two or three).

The present invention has the aim of mechanizing and automating the process of prior art, substantially eliminating or mitigating the inefficiencies and risks currently found; dramatic reduction the time of idle vessels in piers paying high daily rates; increase in quality of welds inspections and overall quality.

The process of present invention provides inside the manufacturing installation one or more welding cabins and a series of supporting devices for driving rollers and free-rotation synchronized supporting the pipe sections and at the same time allow movement of the whole string (Stalk) without external interference, after joining of several pipe sections (welded one another) in variable length, for the embodiments involved in present invention, each string (Stalk) can have about 1.2 km in length or more.

Once the union of several pipe sections is made and the first string (Stalk) is welded having about 1.2 km (lengths higher or shorter) in extension, it is made the confirmation of structural integrity and uniformity and the welding thereof, this is moved forward upon pulling by driving rollers coordinated such that the string leaves the manufacturing installation and is conducted to the outside site, in the same alignment of the welding line ("fire line") without human interference or risk of deleterious external actions.

The string ("Stalk") is displaced by a line of external driving rollers synchronized to the auxiliar production site where it is to be moved to a central area of production line of work site ("Spoolbase") lifting by fixed port system provided of electrical rolling bridges and synchronized for vertical lifting and lateral displacement (translation) of the whole string of pipes at once, in a single operation, in an estimated time of 4 minutes, against prior estimates of 4-6 hours by the older system); the arrangement and combination between the power of structures (ports) and electrical equipment of are sized for said system to have lifting and pulling capacity allowing the desired operation.

The vertical and horizontal movement of pipes ("Stalks") is performed upon actuating the lifting and displacement system of pipes (electrical ports and hoists) in a totally synchronizing way, automated and without any direct human interference, whether handling equipment on the floor or by required expertise for performing the method of prior art.

Said lifting system is provided with several ports comprising the fixed structures provided with electrical and synchronized rolling bridges along about 1 km in length (or more), the ports being disposed each 10-30 meters, depending on the configuration desired for remotely operated lifting/electrical hoist and in synchronization with the other devices for lifting/electrical hoist of each lifting port, and all operations of ports are monitored by video cameras and operations redundancy sensors that detect coupling regularity of jaws, weight and stress foreseen for lifting, speed, control and effectiveness of translating the string.

All these elements for monitoring, measuring and safety are checked from a single remote control cabin that surveys and controls; records and logs in a digital media all the automated procedures, including the displacement of strings through the driving rollers lines.

It should be emphasized at this time that the configuration of each production line will depend on the span between the ports and/or the capacity of each lifting/electrical hoist device, which makes the process of present invention perfectly adaptable and modular, according to the requirements.

Another characteristic of the process of present invention is that it is possible to manufacture strings (Stalk) and conduct lines of several diameters, at the same time and in simultaneous phases of displacement, without the configurations of the manufacturing installation requiring alterations or adjustments.

After launching the string (Stalk) of about 1 km (or more) in the first line of motorized rollers disposed laterally in relation to the central area of storing the production line (main Fireline), the lifting system is actuated and the pipe disposed in the line of motorized rollers is lifted by the lifting devices of the stations and disposed in the central area of storage of pipe stacks ("lung" stock).

It is noted that the first roller line transporting the string from the production line (fireline) to the central area of pipe storage is partially disposed under the lifting ports.

In the sequence, and upon specific demand, the lifting ports, by the devices of lifting/electrical hoist in coordination and synchronized provide the displacement of the string to a second line of motorized rollers for transportation of pipes (secondary Fireline), parallel to the central area of pipe storage and in a side opposed to the first line of motorized rollers for transporting pipes.

As the first roller line transports the string from the production line (main fireline) to the central of pipe storage, the second line of transportation motorized rollers is also disposed under the lifting stations and transports the column to a second production line (secondary fireline).

It is noted that the second roller line transporting the string from central area of pipe storage to the second production line (fireline) is partially disposed under lifting ports.

At this time, it worth noting that the process of present invention does not exhibit differences as to the steps of manufacturing strings, transportation and storage in "lung" for later use, but as to the operational mode employed, much more efficient, rapid and safe.

In the sequence, after displacement of the pipe to the second line of motorized rollers for transporting pipes, the string is displaced towards the secondary fireline for welding (and later checking of integrity of weld and string) of the site joint lining and the strings one another, said displacement also being preferred in the direction of the embarkation point of the coiled section disposed in vessel.

However, in that first embodiment, the system of present invention totally automated provides feeding of lines of pipes of about 5 km or more in a substantially reduced time with greater safety and reliability of integrity of resulting line.

The present invention further provides a second embodiment, illustrated in general in FIG. 1 comprising the following steps of first embodiment, namely:

manufacturing of pipe strings of 1 km (or more) in length in a main fireline upon welding of several pipe sections;

displacement of string of about 1 km in length along the first roller line disposed under the lifting ports transporting the string from the production line (main fireline) to the central area of storage of pipes ("lung" stock) equally disposed under the lifting ports;

lifting of pipe from the first roller line disposed under the lifting ports to a central area of storage of pipes through the lifting system that comprises several fixed ports equipped with electrical rolling bridges operating in synchronism for lifting the string from the roller line and disposing said string in the central area of pipe storage ("lung" stock), and lifting of the string from the central area of storage of pipes to a second roller line disposed under the lifting ports, parallel to the central area of storage of pipes and opposed to the first motorized roller line for transporting the string.

The difference between the first and second embodiments arises from the fact that the second embodiment is provided in one lane (street) with supports comprising automated and synchronized driving rollers arranges in "self-supporting" triplex structures of greater number of levels or piperacks having adequate extension of about 5 km or more of at least one line, or more as necessary to provide integral length to the intended string outline with the displacement of pipes of 1 km through the second in the same direction of the displacement made by the first line continuously towards the embarkation point and complete feeding of all capacity of spool of the device receiving the string arranged in vessel.

In the second embodiment, said displacement in the second line occurs in the direction of a second "fireline" opposed to the fireline that conducted the manufacturing of strings (stalks) of about 1 km comprising a second welding and checking station to join said columns, said displacement being directed to a continuous loop and uninterrupted of storing, in the embodiment shown and illustrated in FIGS. 1, 2, 3, 4, 5, 6, 7, 9, 10, 11 having capacity to store one or more strings of pipes having about 5 km in sets of rollers (pipe racks) with more than one level of storage (see FIGS. 9 and 10), said continuous and uninterrupted displacement being directed to a storage loop having its total maximum capacity between 4.0 to 7.0 kilometers, not limited only to such lengths.

In the second embodiment, the resulting pipes are stored in "racks" waiting for the time to be embarked. As illustrated in FIG. 1, a line in the shape of a drop, but not limited to the same, can assume another shape to increase the section from 5 km to much more. That multiplex structure is positioned and is arranged after the second "fireline" for storage of pipes of about 5 km in length or more.

In that embodiment, the total time of operation since the manufacturing of the strings to embarkation is substantially reduced due to the automation integral and non-interruption of procedure phases. However, the great operational advantage is that it can be stored one or more conduct lines of about 5 km without stopping the production of strings of about 1 km.

It should be emphasized that in both embodiments shown the displacement and lifting of strings is made upon synchronized and automated movement, scheduled and controlled from a main control cabin arranged in an appropriate position in the production line, being able to comprise additionally more than one control cabin for each processing step.

As an idea of the advantages from the system of present invention, the fact of storing conduct lines of 5 km or more allows a shorter stay of the vessel for embarkation of the same (about U$ 300,000.00 (three-hundred thousand dollars) per day); delivery of the whole order more rapid; better use of time and manufacturing space among other secondary advantages.

For example, in an order of a pipe string/string of 90 kilometers, taking into account that a ship duly loaded with a line of 5 km should depart to start installation of the same and return to the embarkation site of line of pipe/string after a considerable time, and frequently uncertain, as it depends on favorable climate and technical conditions estimated in about one to two weeks we can foresee with the use of the system of present invention the embarkation almost immediate of a second line of pipe of about 5 km as soon as the vessel returns to the embarkation site.

As a consequence, the time to provide a line of 90 km in length is extremely reduced when using the second embodiment of present invention, that is complimentary and alternate to the first embodiment when compared to the prior art.

The advantages of present invention over the state of the art are evident, as there are provided methods of construction of strings in a more rapid and consistent way with greater safety as to the resulting integrity of strings (stalks) and without the risks inherent to the current procedure, worth considering as evident commercial, financial and economic advantage the fact that the methods of present invention provide a final product of better quality and in a time substantially shorter, reducing the financial and operational costs in the installation of submarine conduct lines.

It should be emphasized that in both embodiments, the production of strings by the driving roller line in the length between 500 to 1,500 meters can be performed with each string (stalk) of 500 meters amounting a total branch (pipe string) of 1,500 meters in a single operation, using 3 welds and with welds in 3 different phases, root weld pass, filling weld pass, and finishing weld pass, all procedures occurring in parallel starting at the same time and with the column moving and passing over the driving rollers.

Examples of Application of Present Invention

Some examples wherein the system and process of present invention finds application is in the manufacture of pipes for industrial sections, coolers for nuclear plants, multifunctional piers, tunnels, micro tunnels, production risers, subsea/underground, and submarine multi-phase electro conduits.

With the system of present invention, the assembling of the pipeline is remote, and the sequential embarkation through pre-installed elements without the drawbacks of climate and handling and lifting operations of pipe sections.

In spite of present invention being illustrated according to the embodiment currently preferred, it is understood that the same is not limiting the invention, since the alterations and modifications will be apparent to the technicians in light of the previous explanation. Therefore, the invention shall not be limited, unless by the scope of the following claims.

DESCRIPTION OF PREFERRED EMBODIMENTS

In a first embodiment, the process of present invention comprises
manufacturing of pipe strings in a first production line (main fireline) upon welding of several pipe sections;
displacement of the string through a first roller line extending from the final portion of the first production line (main fireline) transporting the string from the first production line (main fireline) to the central area of storage of pipes ("lung" stock) equally disposed under the lifting ports, the first roller line disposed in part of its travel under the lifting ports;
lifting of pipe from the first roller line disposed under the lifting ports to a central area of storage of pipes through the lifting system that comprises several fixed ports equipped with electrical rolling bridges operating in synchronism for lifting the string from the first roller line and disposing said string in the central area of pipe storage ("lung" stock);
lifting of the string from the central area of storage of pipes to a second roller line disposed under the lifting ports, parallel to the central area of storage of pipes and opposed to the first motorized roller line for transporting the string; and
displacement of said string disposed in the second motorized roller line for transporting pipes, the string being displaced towards a second secondary fireline for welding the string by one of the ends thereof with other strings already disposed in the fireline or to be disposed, and after said welding, in a concomitant way, it is performed the checking of integrity of welding, of the lining of field joints and the strings themselves, said displacement occurring towards the embarkation point of the coiled section disposed in the vessel.

In this embodiment, the strings to be manufactured cam comprise between 500 and 1,500 meters in length, and the pipe sections used in manufacturing of strings comprise pipe segments of 6 to 18 meters in length. Further, the process of present invention accepts section in "double joint" of 24, 36 or 48 meters.

The pipe sections of the resulting string comprise a given diameter, the diameter of each string being variable according to the pipe section used, and in the embodiment now proposed the pipe sections comprise dimensions of about 76.20 mm (3" inches) to about 1,524.00 mm (60" inches) diameter, which does not avoid greater/shorter diameters of pipe sections being used; regardless of thickness and grade of steel of the wall of each pipe, determined by standards ASTM, API, ANSI, NBR, DIN, EN, BSA, of the steel of the walls thereof in all grades comprised between API X50 to X120.

In the first embodiment, the first production line extends for about 1,500 to 2,000 meters, and comprises in sequence a first welding and checking cabin and the first driving rollers line, and the first driving rollers line is comprised of at least within at least 1,000 meters its extension below the ports; while the second production line extends for about 1,500 to 2,000 meters, and comprises in sequence the second driving rollers line and a second welding and checking cabin, the second driving roller line being comprised in at least 1,000 meters its extension under the ports; the first and second production lines comprising about 150 to 3330 driving rollers each.

In first embodiment, the so-called central site comprises in parallel the first and second driving rollers lines and between the first and second lines the central portion of the site where the strings of pipes are stored, and over the whole extension of the central portion of the site are arranged lifting ports, the central site comprising in present embodiment about 54 to 84 lifting ports, each port comprising at least one rolling bridge.

Another very important feature is that the process of present invention is totally automated, being controlled and managed remotely upon controlling and monitoring from one or more controlling and monitoring cabins, said one or more cabins being disposed in the work site or adjacent thereto.

As inferred from the above, the process of present invention allows manufacturing of strings (Stalk) and conduct lines of several diameters and lengths, at the same time and in simultaneous phases of displacement, without the configurations of the manufacturing installation having to be changed or adjusted substantially, being worth noting that the displacement of the line can occur towards a direction other than that of the embarkation point of the coiled section arranged in the vessel.

The second embodiment is quite similar to first embodiment which confirms and assures the unity of invention.

The second embodiment of present invention provides a manufacturing, assembling and construction process continues with progressive displacement of pipe sections in a Spoolbase comprising:
- manufacturing of pipe strings in a first production line (main fireline) upon welding of several pipe sections;
- displacement of the string through a first roller line extending from the final portion of the first production line (main fireline) transporting the string from the first production line (main fireline) to the central area of storage of pipes ("lung" stock) disposed under the lifting ports, the first roller line disposed in part of its travel under the lifting ports;
- lifting of pipe from the first roller line disposed under the lifting ports to a central area of storage of pipes through the lifting system that comprises several fixed ports equipped with electrical rolling bridges operating in synchronism for lifting the string from the first roller line and disposing said string in the central area of pipe storage ("lung" stock);
- lifting of the string from the central area of storage of pipes to a second roller line disposed under the lifting ports, parallel to the central area of storage of pipes and opposed to the first motorized roller line for transporting the string;
- displacement of said string disposed in the second motorized roller line for transporting pipes, the string being displaced towards a second secondary fireline for welding the string by one of the ends thereof with other strings already disposed in the fireline or to be disposed, and after said welding, in a concomitant way, it is performed the checking of integrity of welding, and the strings themselves, said displacement occurring towards the embarkation point of the coiled section disposed in the vessel, said displacement being directed to a continuous loop of storage; and
- storage of conduct lines in a storage loop.

The qualifications and quantifications of elements provided for the first embodiment are substantially the same in the second embodiment, except as to the storage loop which can store conduct lines of several diameters at the same time and during simultaneous phases of manufacturing steps, without the configurations of manufacturing installation being altered or adjusted, the storage loop comprising a lane (street) with supports comprising automated and synchronized driving rollers disposed in supporting structures having at least capacity for a conduct line (not limited only to this quantity), the driving rollers being configured to allow in an automated and synchronized way the displacement and delivery of conduct lines in the axial direction, said supports can be of the types (a) self-supporting supports capable of supporting a conduct line; (b) "self-supporting" triplex supports having capacity up to three conduct lines; (c) supports having four or more levels; piperack-type supports; all supports comprising motorized rollers to allow displacement and "delivery of conduct in the axial direction towards the coiling spool of this conduct inside the vessel.

Further, in second embodiment, preferably, the displacement of the one or more conduct lines of the storage loop 6 continuously made towards the embarkation point of the spool of the device receiving the string, arranged in the vessel, said continuous and uninterrupted displacement being directed to a storage loop of its total maximum capacity between 4.0 to 7.0 kilometers, not limited to said lengths only.

However, said displacement can occur towards other than the embarkation point of the coiled section disposed in the vessel.

It should be emphasized that in both embodiments, the production strings by the driving roller line in the length comprised between 500 to 1,500 meters can be made with each string (stalk) of 500 meters to complete a total section (line of pipe) of 1,500 meters in a single operation using 3 welds and having welds in 3 distinct phases, root weld pass, filling weld pass, and finishing weld pass, all the procedures occurring in parallel and starting at the same time and with the moving string passing over the driving rollers.

DESCRIPTION OF ELEMENTS IN ORDER OF APPEARANCE first production line (1)
strings (10)
second production line (20)
a central site (25)
lung stock (30)
ports (15),
storage site of finished conduct lines (66);
first roller line (16)
second roller line (26)
stock of pipes (2)
rolling bridges (36) and
string supporting elements (17)
automated and synchronized driving rollers (6)
piperack (46)
driving roller (6)
spool-type vessel (56)

line (50).
supporting roller (60)

The invention claimed is:

1. A process for continuous manufacturing assembling and constructing with progressive displacement of pipe sections in a spool base, the process comprising the following steps:
    manufacturing of pipe strings in a first production line upon welding of several pipe sections, wherein the pipe sections comprising sections of 6 to 18 meters in length;
    displacement of a string through a first roller line extending from a final portion of the first production line transporting the string from the first production line to a central area of storage of pipes disposed under lifting ports, the first roller line disposed in part of its travel under the lifting ports;
    lifting of pipe from the first roller line disposed under the lifting ports to the central area of storage of pipes through the lifting system that comprises several fixed ports equipped with electrical rolling bridges operating in synchronism for lifting the string from the first roller line and disposing said string in the central area of pipe storage;
    lifting of the string from the central area of storage of pipes to a second roller line disposed under the lifting ports, parallel to the central area of storage of pipes and opposed to the first motorized roller line for transporting the string;
    displacement of said string disposed in the second roller line for transporting pipes, the string being displaced towards a second secondary fireline for welding the string by one of the ends thereof with other strings of the pipe strings already disposed in the fireline or to be disposed, and after said welding, checking of integrity of welding of linings is performed concomitant with checking the pipe strings, said displacement occurring towards an embarkation point of a coiled section disposed in a vessel.

2. The process according to claim 1, wherein the pipe strings are from 500 to 1,500 meters in length.

3. The process according to claim 1, wherein the pipe sections comprise sections in double joint of 24, 36 or 48 meters.

4. The process according to claim 1, wherein the pipe sections have a certain diameter, and each string of the pipe strings has a diameter according to the diameter of the pipe sections.

5. The process according to claim 1, wherein the first production line extends for about 1,500 to 2,000 meters, the first production line comprising a first welding and checking cabin, and a first driving roller, the first welding and checking cabin being disposed before the first driving roller, and the first driving roller extending at least 1,000 meters under the lifting ports.

6. The process according to claim 1, further comprising a second production line that extends for about 1,500 to 2,000 meters, the second production line comprising a second welding and checking cabin, and a second driving roller, the second driving roller being disposed before the second driving welding and checking cabin, and the second driving roller extending at least 1,000 meters under the lifting ports.

7. The process according to claim 1, wherein the central area comprises about 54 to 84 lifting ports, each port comprising at least one rolling bridge.

8. The process according to claim 1, wherein the process is totally automated.

9. The process according to claim 1, wherein the process is controlled and monitored remotely upon controlling and monitoring from one or more control and monitoring cabins, said one or more cabins being disposed in the work site or adjacent thereto.

10. The process according to claim 1, wherein the displacement can occur in a direction other than the embarkation point of the coiled section disposed in the vessel.

11. The process according to claim 1, wherein strings and conduct lines of several diameters are manufactured at the same time and in simultaneous displacement phases without the configurations of the manufacturing installation being altered or adjusted.

12. The process according to claim 1, wherein the production of strings by a driving roller in the length between 500 to 1,500 meters can be performed with each string (stalk) of 500 meters amounting a total branch of 1,500 meters in a single operation, using 3 welds and with welds in 3 different phases, root weld pass, filling weld pass, and finishing weld pass, all procedures occurring in parallel starting at the same time and with the column moving and passing over driving rollers.

13. A process for continuous manufacturing, assembling and constructing with progressive displacement of pipe sections in a spool base, the process comprising the following steps:
    manufacturing of pipe strings in a first production line upon welding of several pipe sections, wherein the pipe sections comprising sections of 6 to 18 meters in length;
    displacement of a string from the pipe strings through a first roller line extending from a final portion of the first production line transporting the string from the first production line to a central area of storage of pipes disposed under lifting ports, the first roller line disposed in part of its travel under the lifting ports;
    lifting of pipe from the first driving roller disposed under the lifting ports to a central area of storage of pipes through a lifting system that comprises several fixed ports equipped with electrical rolling bridges operating in synchronism for lifting the string from the first driving roller and disposing said string in the central area of pipe storage;
    lifting of the string from the central area of storage of pipes to a second driving roller disposed under the lifting ports, parallel to the central area of storage of pipes and opposed to the first driving roller for transporting the string;
    displacement of said string disposed in the second driving roller for transporting pipes, the string being displaced towards a second secondary fireline for welding the string by one of the ends thereof with other strings already disposed in the fireline or to be disposed, and after said welding, checking of integrity of welding of site joint lining is performed concomitant with checking integrity and the strings, said displacement occurring towards an embarkation point of a coiled section disposed in a vessel, said continuous and uninterrupted displacement being directed to a storage loop of maximum total capacity between 4.0 and 7.0 kilometers; not limited only to these lengths; and
storage of conduct lines in a storage loop.

14. The process according to claim 13, wherein the strings are from 500 to 1,500 meters in length.

15. The process according to claim 13, wherein the pipe sections comprise sections in double joint of 24, 36 or 48 meters.

16. The process according to claim 13, wherein the pipe sections have a certain diameter, and each string of the pipe strings has a diameter according to the diameter of the pipe section used, and regardless the thickness and steel grade of the wall of each pipe.

17. The process according to claim 13, wherein the first production line extends for about 1,500 to 2,000 meters, the first production line comprising a first welding and checking cabin, and the first driving roller, the first welding and checking cabin being disposed before the first driving roller, and the first driving roller extending at least 1,000 meters under the lifting ports.

18. The process according to claim 13, further comprising a second production line that extends for about 1,500 to 2,000 meters, the second production line comprising a second welding and checking cabin, and the second driving roller, the second driving roller being disposed before the second driving welding and checking cabin, and the second driving roller extending at least 1,000 meters under the lifting ports.

19. The process according to claim 13, wherein the central area comprises about 54 to 84 lifting ports, each port comprising at least one rolling bridge.

20. The process according to claim 13, wherein the process is totally automated.

21. The process according to claim 13, wherein the process is controlled and monitored remotely upon controlling and monitoring from one or more control and monitoring cabins, said one or more cabins being disposed in the work site or adjacent thereto.

22. The process according to claim 13, wherein strings and conduct lines of several diameters are manufactured at the same time and in simultaneous displacement phases without the configurations of the manufacturing installation being altered or adjusted.

23. The process according to claim 13, wherein the storage loop can store duct lines of several diameters at the same time and during simultaneous phases of the manufacturing steps without the configurations of the manufacturing installation having to be altered or adjusted.

24. The process according to claim 13, wherein the storage loop comprises a lane having supports comprising automated and synchronized driving rollers disposed in self-supporting structures or pipe racks having at least capacity for a conduct lie, the driving rollers being configured to allow, in an automated and synchronized way, displacement and delivery of conduct lines in the axial direction.

25. The process according to claim 13, wherein the storage loop has supports of the type self-supporting triplex structures with capacity for at least three conduct lines or as many more as necessary.

26. The process according to claim 13, wherein each conduct line comprises adequate extension of about 5 km or more.

27. The process according to claim 13, wherein the storage loop has supports having four or more levels with motorized rollers to allow displacement and delivery of conduct in the axial direction towards the coiling spool of this conduct inside the vessel.

28. The process according to claim 13, wherein the displacement of the one or more conduct lines of the storage loop is continuous and uninterrupted towards the embarkation point of the spool of the device receiving the string, arranged in the vessel.

29. The process according to claim 28, wherein the displacement can be in a direction other than the embarkation point of the coiled section disposed in the vessel.

30. A process for continuous manufacturing assembling and constructing with progressive displacement of pipe sections in a spool base, the process comprising the following steps:
manufacturing of pipe strings in a first production line upon welding of several pipe sections, wherein each string of the pipe strings has a diameter according to the diameter of the pipe sections and wherein the pipe sections comprising dimensions of about 76.20 mm (3" inches) to about 1,524.00 mm (60" inches) diameter, regardless of the thickness and grade of steel of the wall of each pipe;
displacement of a string from the pipe strings through a first roller line extending from a final portion of the first production line transporting the string from the first production line to a central area of storage of pipes disposed under lifting ports, the first roller line disposed in part of its travel under the lifting ports;
lifting of pipe from the first roller line disposed under the lifting ports to the central area of storage of pipes through a lifting system that comprises several fixed ports equipped with electrical rolling bridges operating in synchronism for lifting the string from the first roller line and disposing said string in the central area of pipe storage;
lifting of the string from the central area of storage of pipes to a second roller line disposed under the lifting ports, parallel to the central area of storage of pipes and opposed to the first roller line for transporting the string;
displacement of said string disposed in the second roller line for transporting pipes, the string being displaced towards a second secondary fireline for welding the string by one of the ends thereof with other strings of the pipe strings already disposed in the fireline or to be disposed, and after said welding, checking of integrity of welding of linings is performed concomitant with checking the pipe strings, said displacement occurring towards an embarkation point of a coiled section disposed in a vessel.

31. A process for continuous manufacturing assembling and constructing with progressive displacement of pipe sections in a spool base, the process comprising the following steps:
manufacturing of pipe strings in a first production line upon welding of several pipe sections, wherein the first production line comprises about 150 to 330 driving rollers;
displacement of a string from the pipe strings through a first roller line extending from a final portion of the first production line transporting the string from the first production line to a central area of storage of pipes disposed under lifting ports, the first roller line disposed in part of its travel under the lifting ports;
lifting of pipe from the first roller line disposed under the lifting ports to the central area of storage of pipes through a lifting system that comprises several fixed ports equipped with electrical rolling bridges operating in synchronism for lifting the string from the first roller line and disposing said string in the central area of pipe storage;
lifting of the string from the central area of storage of pipes to a second roller line disposed under the lifting ports, parallel to the central area of storage of pipes and opposed to the first roller line for transporting the string;

displacement of said string disposed in the second roller line for transporting pipes, the string being displaced towards a second secondary fireline for welding the string by one of the ends thereof with other strings of the pipe strings already disposed in the fireline or to be disposed, and after said welding, checking of integrity of welding of linings is performed concomitant with checking the pipe strings, said displacement occurring towards an embarkation point of a coiled section disposed in a vessel.

32. A process for continuous manufacturing, assembling and constructing with progressive displacement of pipe sections in a spool base, the process comprising the following steps:

manufacturing of pipe strings in a first production line upon welding of several pipe sections, wherein each string of the pipe strings has a diameter according to the diameter of the pipe sections and wherein the pipe sections comprising dimensions of about 76.20 mm (3" inches) to about 1,524.00 mm (60" inches) diameter, regardless of the thickness and grade of steel of the wall of each pipe;

displacement of a string from the pipe strings through a first roller line extending from a final portion of the first production line transporting the string from the first production line to a central area of storage of pipes disposed under lifting ports, the first roller line disposed in part of its travel under the lifting ports;

lifting of pipe from the first driving roller disposed under the lifting ports to a central area of storage of pipes through a lifting system that comprises several fixed ports equipped with electrical rolling bridges operating in synchronism for lifting the string from the first driving roller and disposing said string in the central area of pipe storage;

lifting of the string from the central area of storage of pipes to a second driving roller disposed under the lifting ports, parallel to the central area of storage of pipes and opposed to the first driving roller for transporting the string;

displacement of said string disposed in the second driving roller for transporting pipes, the string being displaced towards a second secondary fireline for welding the string by one of the ends thereof with other strings already disposed in the fireline or to be disposed, and after said welding, checking of integrity of welding of site joint lining is performed concomitant with checking integrity and the strings, said displacement occurring towards an embarkation point of a coiled section disposed in a vessel, said continuous and uninterrupted displacement being directed to a storage loop of maximum total capacity between 4.0 and 7.0 kilometers; not limited only to these lengths; and storage of conduct lines in a storage loop.

33. A process for continuous manufacturing, assembling and constructing with progressive displacement of pipe sections in a spool base, the process comprising the following steps:

manufacturing of pipe strings in a first production line upon welding of several pipe sections, wherein the first production line comprises about 150 to 330 driving rollers;

displacement of a string from the pipe strings through a first roller line extending from a final portion of the first production line transporting the string from the first production line to a central area of storage of pipes disposed under lifting ports, the first roller line disposed in part of its travel under the lifting ports;

lifting of pipe from the first driving roller disposed under the lifting ports to a central area of storage of pipes through a lifting system that comprises several fixed ports equipped with electrical rolling bridges operating in synchronism for lifting the string from the first driving roller and disposing said string in the central area of pipe storage;

lifting of the string from the central area of storage of pipes to a second driving roller disposed under the lifting ports, parallel to the central area of storage of pipes and opposed to the first driving roller for transporting the string;

displacement of said string disposed in the second driving roller for transporting pipes, the string being displaced towards a second secondary fireline for welding the string by one of the ends thereof with other strings already disposed in the fireline or to be disposed, and after said welding, checking of integrity of welding of site joint lining is performed concomitant with checking integrity and the strings, said displacement occurring towards an embarkation point of a coiled section disposed in a vessel, said continuous and uninterrupted displacement being directed to a storage loop of maximum total capacity between 4.0 and 7.0 kilometers; not limited only to these lengths; and storage of conduct lines in a storage loop.

* * * * *